United States Patent [19]

Wright

[11] 4,053,245
[45] Oct. 11, 1977

[54] CONNECTOR

[76] Inventor: Peter Damian Wright, 137 West 2nd Ave., Vancouver, B.C., Canada, V5Y 1B8

[21] Appl. No.: 682,231

[22] Filed: May 3, 1976

[51] Int. Cl.² .............................................. F16B 1/00
[52] U.S. Cl. ................................... 403/188; 403/231; 403/403; 52/633; 211/191
[58] Field of Search ............... 403/231, 403, 188, 189, 403/187, 402, 393, 382, 205; 52/758 H, 633; 211/191, 192; 108/109, 107

[56] References Cited

U.S. PATENT DOCUMENTS

| | | | |
|---|---|---|---|
| 3,261,309 | 7/1966 | Kinnear | 403/403 X |
| 3,339,750 | 9/1967 | Nelson-Hawkins | 211/191 |
| 3,415,554 | 12/1968 | Papayotl | 403/187 |

FOREIGN PATENT DOCUMENTS

| | | | |
|---|---|---|---|
| 1,201,618 | 7/1959 | France | 52/633 |
| 1,179,076 | 12/1958 | France | 52/758 H |
| 282,065 | 12/1964 | Netherlands | 52/633 |

*Primary Examiner*—Andrew V. Kundrat
*Attorney, Agent, or Firm*—Townsend and Townsend

[57] ABSTRACT

A connector for use in connecting two perforate members at a predetermined angle. The connector comprises a base plate. A first catch member on the base plate is able to engage in a perforation in one of the perforate members. A second catch member on the base plate is able to engage with a perforation in the second perforated member when the two members are placed together at the predetermined angle. A third catch member on the base plate is able to engage a perforation in each perforate member that is spaced from a perforation engaged by the first and second catch members. An offset is formed in the plate between either the first or the second catch member and the third catch member. The offset is about equal to the thickness of one perforate member.

9 Claims, 4 Drawing Figures

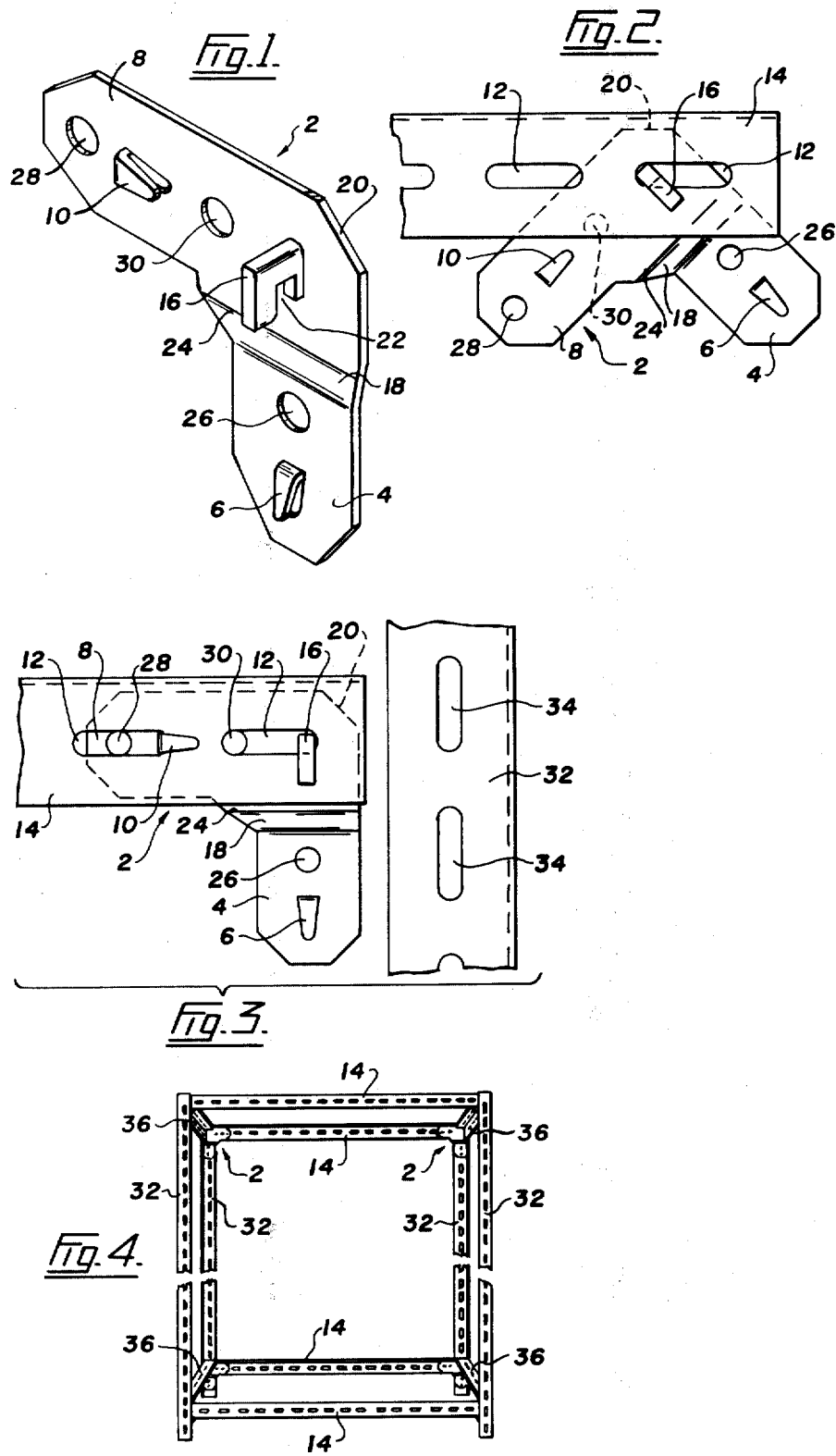

CONNECTOR

FIELD OF THE INVENTION

This invention relates to a connector for use in connecting two perforate members at a predetermined angle. More particularly, the present invention relates to a connector for use in structural framing systems made of slotted angle framing.

DESCRIPTION OF PRIOR ART

Slotted angle framing is widely used, particularly in industry, as shelving and racking. Prior to the present invention slotted angle free-standing framing has been held together securely and rigidly at the required number of corners by nuts and bolts and the like either in plurality without auxilliary bracing, or combined with gusset plates, diagonal braces and the like. to construct the desired framing, angle is cut to the required length by the supplier or by the user. Shear action portable cutters are widely available for this purpose. The required lengths are then joined together using the above connection systems. Slotted angle is inexpensive, easily shipped and finds wide application for basic shelving structures and special purpose storage racks. However, the existing slotted angle systems do not provide an adequate boltless device that can be mounted or dismounted quickly and easily without tools and provides secure, load-supporting and rigid corner-bracing joins between horizontal and vertical members.

Apart from slotted angle, framing systems are available comprising lugs, cleats and other projections welded, bolted or rivetted to, or forming integral parts of, the horizontal or vertical members. These other framing systems provide some degree of flexibility and adjustability but restrict on-site dimensional changes and do not allow complete changeability and interchangeability of horizontal and vertical components. They are also more expensive to manufacture, package and ship.

SUMMARY OF INVENTION

The present invention seeks to avoid the above disadvantages by providing an independently mounted and dismounted connector that is unobstrusive in appearance, simple to use and provides excellent bracing to connected framing pieces.

Accordingly, in one aspect, the present invention is a connector for use in connecting two perforate members at a predetermined angle, the connector comprising, a base plate, a first catch member on the base plate able to engage in a perforation in one of the perforate members, a second catch member on the base plate able to engage with a perforation in the second perforated member when the two members are placed together at the predetermined angle, a third catch member on the base plate able to engage a perforation in each perforate member that is spaced from a perforation engaged by the first and second catch members, and an offset formed in the plate between either the first or the second catch member and the third catch member, the offset being about equal to the thickness of one perforate member.

In a preferred aspect the connector comprises a first limb formed with a catch member able to engage in a perforation in one of the perforate members, a second limb formed at about the predetermined angle to the first limb and formed with a second catch member able to engage in a perforation in the second of the perforate members when the perforate members are put together at the predetermined angle, a third catch member adjacent the intersection of the limbs, aligned with the first catch member and disposed at the predetermined angle to the second catch member and able to engage in a perforation in each of the perforate members when the perforate members are placed together at the predetermined angle, and an offset in one of the limbs between the catch member in that limb and the third catch member the offset being equal to the thickness of one perforate member.

The predetermined angle is usually 90°.

In a further aspect the invention is a shelving system made up of end frames joined to each other by front and back members at two or more levels, each end-frame comprising two substantially vertical uprights and two, substantially horizontal cross pieces, the horizontal front and back members and the vertical end-frame members being of angle section formed with a plurality of evenly spaced slots, the horizontal and vertical members being retained in their relative positions by a connector as defined in either of the above aspects of the invention at each corner.

BRIEF DESCRIPTION OF DRAWINGS

The invention is illustrated, by way of example, in the accompanying drawings in which:

FIG. 1 is a perspective view of a connector according to the present invention;

FIG. 2 illustrates the positioning of a connector according to the present invention in a slotted angle bar;

FIG. 3 is a partially exploded view of a joint formed between a vertical and horizontal member using the connector illustrated in FIGS. 1 and 2; and FIG. 4 is a perspective view of a basic unit of shelf framing made up of the components, slotted angle and connectors illustrated in FIGS. 1 to 3.

DESCRIPTION OF PREFERRED EMBODIMENT

In the drawings, FIG. 1 illustrates a connector 2 comprising a base plate made up of a first limb 4 formed with a first catch member 6 and a second limb 8 formed with a second catch member 10. Each catch member 6 and 10 is able to engage in a slotted perforation 12 formed in an angle member 14 as illustrated in FIG. 2. A third catch member 16 is positioned adjacent the intersection of the limbs 4 and 8. The third catch member 16 is aligned with the first catch member 6 and disposed at a predetermined angle (90° in the illustrated embodiment) to the second catch member 10. There is an offset 18 in the first limb 4 that is about equal to the thickness of one angle member 14. The exterior angle of the connector 22 is truncated at 20 to facilitate its positioning in a perforate member. The first catch member 6 is pressed from the first limb 4. Similarly, the second catch member 10 is pressed from the second limb 8. However, the third catch member 16 is more substantial than the first and second catch members and is formed separately and attached to the connector 2, for example by staking or wedging. It should also be noted that the first and second catch members 6 and 10 are spaced from the respective limbs 4 and 8 by an amount just sufficient to enclose the thickness of one angle member 14. However, the catch member 16 includes a space 22 able to encompass the thickness of two angle members.

Desirably, there is webbing 24 to provide bracing between the first limb 4 and the second limb 8.

The first limb 4 is formed with a hole 26. The second limb 8 is formed with two holes 28 and 30.

Use of the connector 2 is illustrated in FIGS. 2 and 3. First the connector 2 is inserted into an end slot 12 of an angle member 14 so that the lug 16 is aligned with and can be pushed through the slot 12. In this position, second limb 8 is substantially perpendicular to the angle member 14. The connector 2 is then pivoted through 90°, passing through the position illustrated in FIG. 2. After rotating 90° the connector 2 is moved outwardly with the second catch member 10 engaging in the radius of the slot 12 with which it cooperates as shown in FIG. 3. It should be noted that the offset 18 is such that the first limb 4 extending downwardly is in substantially the same plane as the surface of the angle member 14. A second angle member 32 formed with slots 34 is placed in position so that the slots 34 are aligned with the catch members 6 and 16. The second angle member 32 is then positioned so that the catch members 6 and 16 project through their respective slots 34. Angle member 14, which is the horizontal angle member, with the connector 2 securely positioned and attached to it may then be tapped downwardly so that the catch members 16 and 6 engage tightly in the lower radii of their respective slots. If required, bolts may be inserted through one or more of holes 26 28 and 30 for applications such as mobile framing units where bolting provides additional strength and security. Alternatively, a safety locking pin may be inserted through hole 26 and lower slot 34 to abut the upper radius of the lower slot 34. This will prevent inadvertent upward movement of the horizontal angle member 14 causing disengagement of the catch members 6 and 16.

FIG. 4 illustrates a basic single bay of a shelving system made up of two end-frames each comprising two horizontal members 36 and two vertical members 32 engaged at the corners by connectors 2 or by any other desired system and either assembled on-site or supplied preassembled. End frames may have single uprights as illustrated or Tee section uprights to provide for add-on bays. Two end-frames are joined together by front and back horizontal members 14 using connector 2 as required to provide secure and rigid free-standing framing. Shelving supports and clips for intermediate levels may be positioned within the openings 34 in the uprights 32 in the conventional manner. In the shelving system illustrated in FIG. 4, when two horizontal members, for example a horizontal member 14 and an end crosspiece 36 connect at the same level on the vertical member 32 the end crosspiece should have its row of aligned slots offset or, preferably, the end crosspiece should be smaller size angle in view of the fact that the said members are usually shorter because of the desired shelf structure.

The preferred system comprises slotted angles of approximately 14 gauge with two equal flanges each having aligned rows of elongated slots of the order of about ¼ inch in width and on a regular pitch. The connectors 2 should be about 14 gauge with the first and second catch members 6 and 10 desirably struck from the body of the bracket and flared and tapered as illustrated in FIG. 1. The third catch member 16 may be desirably formed of 3/16 inch heavy gauge metal to provide a grip fit and shear strength at the central point of the connector. In use, the third connection member 16 is not subject to significant pull-out or sideway stress. Where a lower shear strength connection is acceptable third catch member 16 may be struck from the body of the bracket as for first and second catch members 6 and 10.

The size, design and position of the catch members 6, 10 and 16, the overall size of the connector 2 may be modified to suit any slotting pattern, gauge of material and type of flanged member.

It will be appreciated that the connectors of the invention are right- or left-hand. Right-hand connectors go in the right of a shelving system. The second limb 8 of a right-hand connector extends to the left when the connector is viewed with the catch members 6, 10 and 16 projecting towards the viewer. On left-hand connectors the second limb 8 extends to the right. The connector 2 illustrated in the drawings is righ-hand.

I claim:

1. A connector for use in connecting two perforate members at a predetermined angle, the connector comprising;
   a base plate;
   a first catch member on the base plate able to engage in a perforation in one of the perforate members;
   a second catch member on the base plate able to engage with a perforation in the second perforate member when the two members are placed together at the predetermined angle;
   a third catch member on the base plate able to engage a perforation in each perforate member that is spaced from a perforation engaged by the first and second catch members;
   an offset formed in the base plate between either the first or the second catch member and the third catch member, the offset being about equal to the thickness of one perforate member;
   the three catch members each being L-shaped and extending outwardly from, and substantially parallel to the base plate.

2. A connector for use in connecting two perforate members at a predetermined angle, the connector comprising;
   a first limb formed with a first catch member able to engage in a perforation in one of the perforate members.
   a second limb formed at about the predetermined angle to the first limb and formed with a second catch member able to engage in a perforation in the second of the perforate members when the perforate members are put together at the predetermined angle;
   a third catch member adjacent the intersection of the limbs, aligned with the first catch member and disposed at the predetermined angle to the second catch member and able to engage in a perforation in each of the perforate members when the perforate members are placed together at the predetermined angle;
   an offset in one of the limbs between the catch member in that limb and the third catch member the offset being equal to the thickness of one perforate member;
   the three catch members each being L-shaped and extending outwardly from, and substantially parallel to, the limbs of the connector.

3. A connector as claimed in claim 2 in which the predetermined angle is 90°.

4. A connector as claimed in claim 2 in which the exterior angle of the connector is truncated.

5. A connector as claimed in claim 2 in which the first catch member is pressed from the first limb and the second catch member is pressed from the second limb.

6. A connector as claimed in claim 2 in which the third catch member is more substantial than the first and second catch members and is formed separately and attached to the connector.

7. A connector as claimed in claim 6 in which the third catch member is staked or wedged into place.

8. A connector as claimed in claim 2 webbed to provide bracing between the limbs.

9. A connector as claimed in claim 2 formed with holes that are aligned with the catch members to facilitate locking of the connector in position between two perforate members.

* * * * *